United States Patent
Jain et al.

(10) Patent No.: US 9,483,599 B1
(45) Date of Patent: Nov. 1, 2016

(54) CIRCUIT DESIGN-SPECIFIC FAILURE IN TIME RATE FOR SINGLE EVENT UPSETS

(71) Applicant: Xilinx, Inc., San Jose, CA (US)

(72) Inventors: Praful Jain, Los Gatos, CA (US); James Karp, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 136 days.

(21) Appl. No.: 14/494,361

(22) Filed: Sep. 23, 2014

(51) Int. Cl.
*G06F 17/50* (2006.01)

(52) U.S. Cl.
CPC ....... *G06F 17/5077* (2013.01); *G06F 17/5054* (2013.01); *G06F 17/5081* (2013.01)

(58) Field of Classification Search
None
See application file for complete search history.

(56) References Cited

U.S. PATENT DOCUMENTS

| | | | | |
|---|---|---|---|---|
| 7,036,059 B1* | 4/2006 | Carmichael | ......... | G06F 11/1004 714/725 |
| 7,249,010 B1* | 7/2007 | Sundararajan | ...... | G06F 17/5054 702/185 |
| 7,310,759 B1* | 12/2007 | Carmichael | ......... | G06F 11/1004 714/725 |
| 7,383,479 B1* | 6/2008 | Carmichael | ......... | G06F 11/1004 714/725 |
| 7,512,871 B1* | 3/2009 | Carmichael | ......... | G06F 11/1004 375/376 |
| 7,620,883 B1* | 11/2009 | Carmichael | ......... | G06F 11/1004 714/725 |
| 8,065,644 B1* | 11/2011 | Jacobson | ............ | G06F 17/5054 716/106 |
| 8,375,338 B1 | 2/2013 | Hussein et al. | | |
| 8,407,653 B1* | 3/2013 | Schumacher | ....... | G06F 17/5022 326/14 |
| 8,504,974 B1* | 8/2013 | Trimberger | ........... | G06F 17/504 716/133 |
| 8,661,382 B2* | 2/2014 | Lamb | .................. | G06F 17/5009 703/13 |
| 8,813,013 B2* | 8/2014 | Titley | .................. | G06F 17/5054 716/117 |
| 9,047,429 B2* | 6/2015 | He | ....................... | G06F 17/5054 |
| 2014/0089561 A1* | 3/2014 | Pangal | ................ | G06F 11/1012 711/103 |
| 2016/0049941 A1* | 2/2016 | How | .................... | H03K 19/007 326/9 |

OTHER PUBLICATIONS

Jing et al., "Quantitative SEU Fault Evaluation for SRAM-Based FPGA Architectures and Synthesis Algorithms," 2011 IEEE 21$^{st}$ Int'l Conference on Field Programmable Logic and Applications, pp. 282-285.*
Zhongming et al., "A software solution to estimate the SEU-induced soft error rate for systems implemented on SRAM-based FPGAs," Journal of Semiconductors, vol. 32, No. 5, May 2011, 7 pages.*
Sundararajan et al., "Estimation of Single Event Upset Probability Impact of FPGA Designs," 2003 Proc. of 6$^{th}$ Annual Int'l Conference on <ilitary and Aerospace Programmable Logic Devices, 4 pages.*
Srinavasan et al., "Improving Soft-error Tolerance of FPGA Configuration Bits," 2004 IEEE, pp. 107-110.*
Kaul et al., "Simulation of SEU Transients in CMOS ICs," IEEE Trans. on Nuclear Science, vol. 38, No. 6, Dec. 1991, pp. 1514-1520.*

(Continued)

*Primary Examiner* — Leigh Garbowski
(74) *Attorney, Agent, or Firm* — Kevin T. Cuenot

(57) ABSTRACT

Determining a circuit design-specific, failures in time rate for single event upsets for an integrated circuit (IC) includes determining, using a processor, a number of critical interconnect multiplexer bits for a circuit design for a target IC and determining a number of critical look-up table bits for the circuit design. Using the processor, a device vulnerability factor is estimated for the circuit design for the target IC using the number of critical interconnect multiplexer bits and the number of critical look-up table bits. The estimated device vulnerability factor can be stored, e.g., for subsequent comparison with other circuit designs.

18 Claims, 5 Drawing Sheets

(56) References Cited

OTHER PUBLICATIONS

Reorda et al., "Efficient Estimation of SEU effects in SRAM-based FPGAs," 2005 Proc. of the 11$^{th}$ Int'l On-Line Testing Symposium, 6 pages.*
Sari et al., "Scrubbing-based SEU Mitigation Approach for Systems-on-Prgrammable-Chips," 2011 IEEE, 8 pages.*
Maniatakos et al., "Investigating the Limits of AVF Analysis in the Presence of Multiple Bit Errors," 2013 IEEE 19$^{th}$ Int'l On-Line Testing Symposium, pp. 49-54.*
Graham et al., Consequences and Categories of SRAM FPGA Configuration SEUs, 2003 Military and Aerospace Programmable Logic Devices Int'l Conference, pp. 1-9.*
Asadi et al., "Soft Error rate Estimation and Litigation for SRAM-Based FPGAs," 2005 ACM, pp. 149-160.*
Specification and drawings for U.S. Appl. No. 14/266,547, filed Apr. 30, 2014, Jain et al.
Pratt, Brian et al., "Fine-Grain SEU Mitigation for FPGAs Using Partial TMR," *IEEE Transactions on Nuclear Science*, Aug. 2008, pp. 2274-2280, vol. 55, No. 4, IEEE, Piscataway, New Jersey, USA.
Xilinx, Inc., *LogiCORE IP Soft Error Mitigation Controller v4.1 Product Guide*, PG036, Apr. 2, 2014, pp. 1-118, Xilinx, Inc., San Jose, California, USA.

* cited by examiner

| Case | 302 | MC1 | 318 |
|---|---|---|---|
| 1 | 1 | 1→0 | 1 |
| 2 | 0 | 1→0 | 0→1 |

400

| Case | 302 | MC1 | 304 | MC2 | 318 |
|---|---|---|---|---|---|
| 1 | 1 | 1 | 1 | 0→1 | 1 |
| 2 | 0 | 1 | 0 | 0→1 | 0 |
| 3 | 1 | 1 | 0 | 0→1 | 1 |
| 4 | 0 | 1 | 1 | 0→1 | 0→1 |

500

US 9,483,599 B1

CIRCUIT DESIGN-SPECIFIC FAILURE IN TIME RATE FOR SINGLE EVENT UPSETS

TECHNICAL FIELD

This disclosure relates to integrated circuits (ICs) and, more particularly, to determining a circuit design-specific, failure in time rate for single event upsets for an IC.

BACKGROUND

A Single Event Upset (SEU) is a condition in which a circuit element changes state as a result of a charged particle impacting at or near a transistor junction. The collision of the charged particle with the junction can induce an upset to the state of the transistor. In the case of a memory cell, the change in state is a bit flip where the value of a bit stored in the memory cell changes from a 0 to a 1 or from a 1 to a 0. Vulnerability to SEUs may be expressed in terms of a Failure in Time (FIT) rate. FIT rate is typically expressed as the number of failures that are expected for one billion IC-hours of operation.

Within the semiconductor industry, FIT rate is typically expressed on the IC level. In the case of some programmable ICs, for example, field programmable gate arrays (FPGAs), FIT rate is dependent upon the actual circuit design that is loaded into the IC. In the usual case, determining a circuit design-specific FIT rate is a time consuming and complex endeavor. Specialized Intellectual Property (IP) cores that detect occurrences of SEUs are incorporated into a circuit design, which is then loaded into the IC. A large number of fault injections are performed to obtain statistically meaningful data. A fault injection is an artificial technique for inducing an SEU event in an FPGA static random access memory (SRAM) cell. Detecting design failures often requires providing a set of input vectors to the IC with the circuit design loaded therein, and observing results.

SUMMARY

A method includes determining, using a processor, a number of critical interconnect multiplexer bits for a circuit design for a target integrated circuit (IC), determining a number of critical look-up table bits for the circuit design, and estimating, using the processor, a device vulnerability factor for the circuit design for the target IC using the number of critical interconnect multiplexer bits and the number of critical look-up table bits. The estimated device vulnerability factor can be stored, e.g., for subsequent comparison with other circuit designs.

A system includes a processor programmed to initiate executable operations. The executable operations include determining a number of critical interconnect multiplexer bits for a circuit design for a target IC, determining a number of critical look-up table bits for the circuit design, estimating a device vulnerability factor for the circuit design for the target IC using the number of critical interconnect multiplexer bits and the number of critical look-up table bits, and storing the estimated device vulnerability factor, e.g., for subsequent comparison with other circuit designs.

A non-transitory computer-readable storage medium has instructions stored thereon which, when executed by a processor, perform a method. The method includes determining, using the processor, a number of critical interconnect multiplexer bits for a circuit design for a target IC, determining a number of critical look-up table bits for the circuit design, estimating, using the processor, a device vulnerability factor for the circuit design for the target integrated circuit using the number of critical interconnect multiplexer bits and the number of critical look-up table bits, and storing the estimated device vulnerability factor, e.g., for subsequent comparison with other circuit designs.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description with reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to determining a circuit design-specific failures in time (FIT) rate for single event upsets (SEUs) for an IC. In accordance with the inventive arrangements described herein, a FIT rate for SEUs may be estimated by evaluating critical configuration bits of the circuit design. In one aspect, only those critical bits for selected types of circuit blocks are evaluated. For example, critical bits for interconnect circuit blocks and look-up tables may be evaluated. The critical bits are used to estimate a circuit design-specific FIT rate for SEUs. A circuit design-specific FIT rate for SEUs may also be referred to as a Device Vulnerability Factor (DVF). As defined within this disclosure, a "critical bit" is a configuration bit for an IC that, if flipped from a 0 to a 1 or from a 1 to a 0, causes a change in an output of a circuit of the IC that is configured by the configuration bit.

The inventive arrangements described herein may be implemented as a method or process for determining an estimated DVF as performed by a data processing system. The inventive arrangements may also be implemented as a data processing system having a processor that is programmed to initiate executable operations for determining an estimated DVF. The inventive arrangements further may be implemented as a non-transitory computer-readable storage medium storing program code that, when executed, causes a processor and/or a system to perform and/or initiate a method or process of determining an estimated DVF.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
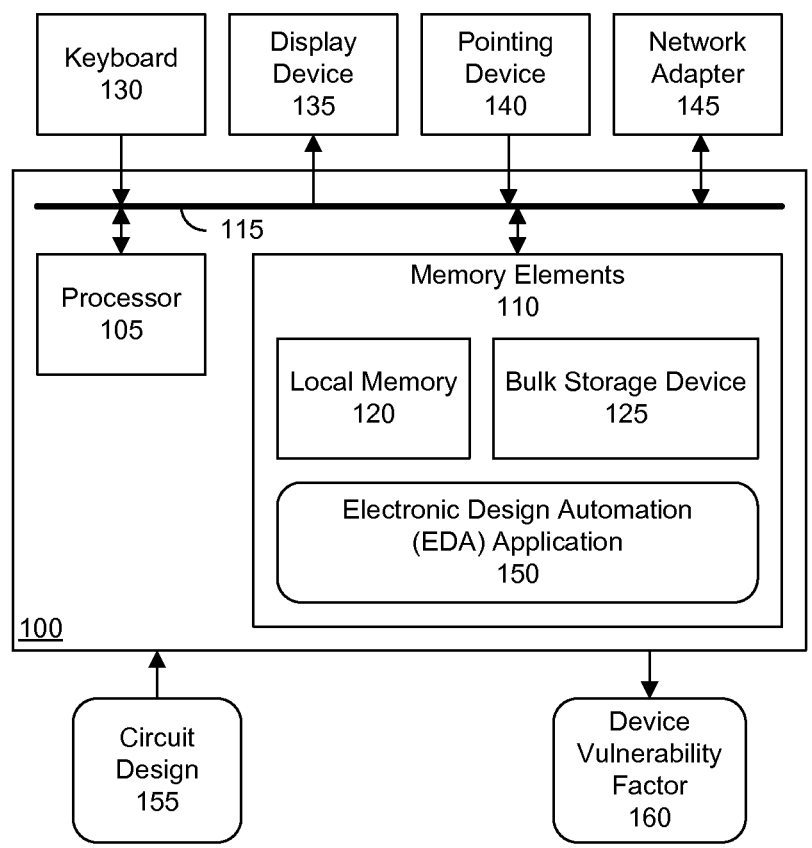
FIG. 1 is a block diagram illustrating an exemplary data processing system.

FIG. 1 is a block diagram illustrating an exemplary data processing system (system) 100. System 100 includes at least one processor, e.g., a central processing unit (CPU), 105 coupled to memory elements 110 through a system bus 115 or other suitable circuitry. System 100 stores program code within memory elements 110. Processor 105 executes the program code accessed from memory elements 110 via system bus 115. In one aspect, system 100 is implemented as a computer or other data processing system that is suitable for storing and/or executing program code. It should be appreciated, however, that system 100 can be implemented in the form of any system including a processor and memory that is capable of performing the functions described within this disclosure.

Memory elements 110 include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from bulk storage device 125 during execution.

Input/output (I/O) devices such as a keyboard 130, a display device 135, and a pointing device 140 may optionally be coupled to system 100. The I/O devices may be coupled to system 100 either directly or through intervening I/O controllers. A network adapter 145 may also be coupled to system 100 to enable system 100 to become coupled to other systems, computer systems, remote printers, and/or remote storage devices through intervening private or public networks. Modems, cable modems, Ethernet cards, and wireless transceivers are examples of different types of network adapter 145 that may be used with system 100.

As pictured in FIG. 1, memory elements 110 store an electronic design automation (EDA) application 150. EDA application 150, being implemented in the form of executable program code, is executed by system 100. As such, EDA application 150 is considered an integrated part of system 100. System 100, while executing EDA application 150, receives and operates upon a circuit design 155. Circuit design 155 is a programmatic description of circuitry to be implemented within an IC. For example, circuit design 155 may be specified using a hardware description language, as a netlist, as a configuration bitstream, a combination thereof, or the like.

Circuit design 155 may be placed and routed. With a placed and routed circuit design, system 100 may correlate the particular circuit components, e.g., programmable circuit blocks and routing resources, used in the circuit design with the particular configuration bits needed to configure the elements. System 100 operates upon circuit design 155 and determines an estimate of DVF 160 from an analysis of the circuit design.

In one aspect, estimated DVF 160 is determined according to a number of critical interconnect multiplexer bits and a number of critical look-up table bits in the circuit design. Estimated DVF 160 is approximately 95% accurate when compared with actual DVF calculations performed using known fault injection techniques which require implementation of the circuit design within the target IC. EDA application 150, circuit design 155, and any data items used, generated, and/or operated upon by EDA application 150 are functional data structures that impart functionality when employed as part of system 100 or when such elements, including derivations thereof, are loaded into an IC such as a programmable IC.

Figure 2:
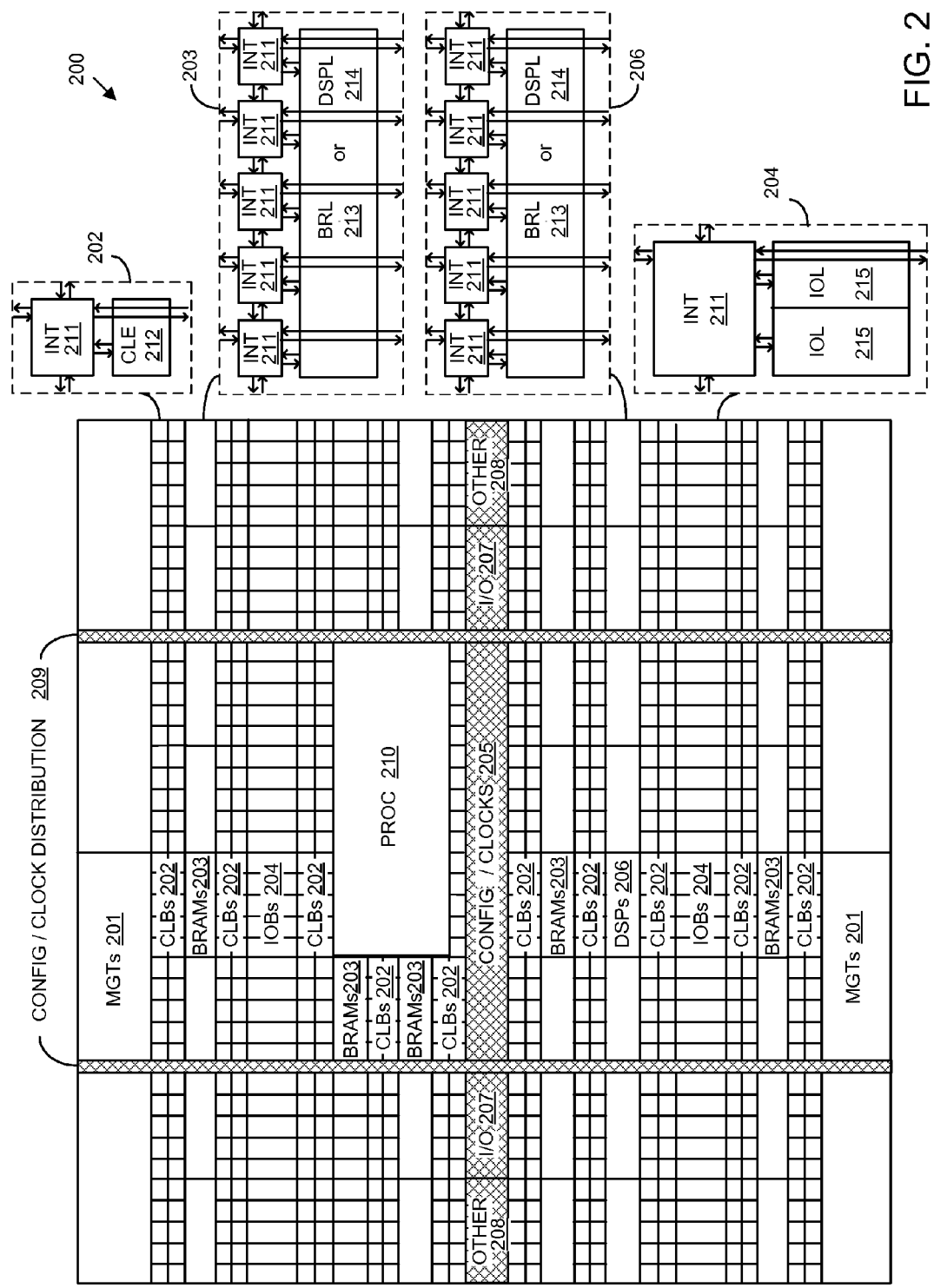
FIG. 2 is a block diagram illustrating an exemplary architecture for an integrated circuit (IC).

FIG. 2 is a block diagram illustrating an exemplary architecture 200 for an integrated circuit (IC). Architecture 200 may be used to implement a programmable IC. For example, architecture 200 may be implemented within a field programmable gate array (FPGA) type of programmable IC. Architecture 200 is also representative of a system-on-chip (SOC) type of IC. An SOC is an IC that includes a processor that executes program code that operates cooperatively with one or more other circuits and/or circuit systems.

As shown, architecture 200 includes several different types of programmable circuit, e.g., logic, blocks. For example, architecture 200 may include a large number of different programmable tiles including multi-gigabit transceivers (MGTs) 201, configurable logic blocks (CLBs) 202, random access memory blocks (BRAMs) 203, input/output blocks (IOBs) 204, configuration and clocking logic (CONFIG/CLOCKS) 205, digital signal processing blocks (DSPs) 206, specialized I/O blocks 207 (e.g., configuration ports and clock ports), and other programmable logic 208 such as digital clock managers, analog-to-digital converters, system monitoring logic, and so forth.

In some ICs, each programmable tile includes a programmable interconnect element (INT) 211 having standardized connections to and from a corresponding INT 211 in each adjacent tile. Therefore, INTs 211, taken together, implement the programmable interconnect structure for the illustrated IC. Each INT 211 also includes the connections to and from the programmable logic element within the same tile, as shown by the examples included at the top of FIG. 2. In one aspect, each INT 211 may include one or more interconnect multiplexers.

For example, a CLB 202 can include a configurable logic element (CLE) 212 that may be programmed to implement user logic plus a single INT 211. A CLE 212 may include one or more look-up tables. A BRAM 203 may include a BRAM logic element (BRL) 213 in addition to one or more INTs 211. Typically, the number of INTs 211 included in a tile depends on the height of the tile. As pictured, a BRAM tile has the same height as five CLBs, but other numbers (e.g., four) may also be used. A DSP tile 206 may include a DSP logic element (DSPL) 214 in addition to an appropriate number of INTs 211. An 10B 204 may include, for example, two instances of an I/O logic element (IOL) 215 in addition to one instance of an INT 211. As will be clear to those of skill in the art, the actual I/O pads connected, for example, to IOL 215 typically are not confined to the area of IOL 215.

In the example pictured in FIG. 2, a columnar area near the center of the die, e.g., formed of regions 205, 207, and 208, may be used for configuration, clock, and other control logic. Horizontal areas 209 extending from this column are used to distribute the clocks and configuration signals across the breadth of the programmable IC.

Some ICs utilizing the architecture illustrated in FIG. 2 include additional logic blocks that disrupt the regular columnar structure making up a large part of the IC. The additional logic blocks may be programmable blocks and/or dedicated circuitry. For example, a processor block depicted as PROC 210 spans several columns of CLBs and BRAMs.

In one aspect, PROC 210 is implemented as a dedicated circuitry, e.g., as a hard-wired processor, that is fabricated as part of the die that implements the programmable circuitry of the IC. PROC 210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 210 is omitted from architecture 200 and replaced with one or more of the other varieties of the programmable blocks described. Further, such blocks may be utilized to form a "soft processor" in that the various blocks of programmable circuitry may be used to form a processor that executes program code as is the case with PROC 210.

The phrase "programmable circuitry" means programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 2 that are external to PROC 210 such as CLBs 202 and BRAMs 203 are considered programmable circuitry of the IC. Programmable circuitry may be configured or programmed to implement different physical circuits therein.

In general, the functionality of programmable circuitry is not established until configuration data is loaded into the IC. A set of configuration bits may be used to program programmable circuitry of an IC such as an FPGA. The configuration bit(s) are typically referred to as a "configuration bitstream." In general, programmable circuitry is not operational or functional without first loading a configuration bitstream into the IC. The configuration bitstream effectively implements or instantiates a particular physical circuit within the programmable circuitry. The configuration bitstream or circuit design specifies, for example, functional aspects of the programmable circuit blocks and physical connectivity among the various programmable circuit blocks that is otherwise non-existent.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry has dedicated circuit blocks and interconnects, for example, that are functional without first loading a configuration bitstream into the IC. An example of hardwired circuitry is PROC 210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

FIG. 2 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 2 are purely exemplary. In an actual IC, for example, more than one adjacent column of CLBs may be included wherever the CLBs appear, to facilitate the efficient implementation of a user circuit design. The number of adjacent CLB columns, however, may vary with the overall size of the IC. Further, the size and/or positioning of blocks such as PROC 210 within the IC are for purposes of illustration only and are not intended as a limitation.

As discussed, a DVF may be estimated from an analysis of a circuit design. In the case of an FPGA, a significant number of failures are related to interconnect circuit blocks (INTs), which include interconnect multiplexers. Also, a significant number of failures are related to CLBs, which include look-up tables. The output of an INT and the output of a look-up table are not logically masked. By evaluating the operation and probability that an SEU will affect the output of each structure that is used in the circuit design, critical bits for each circuit structure may be determined.

Figures 3, 4, 5:
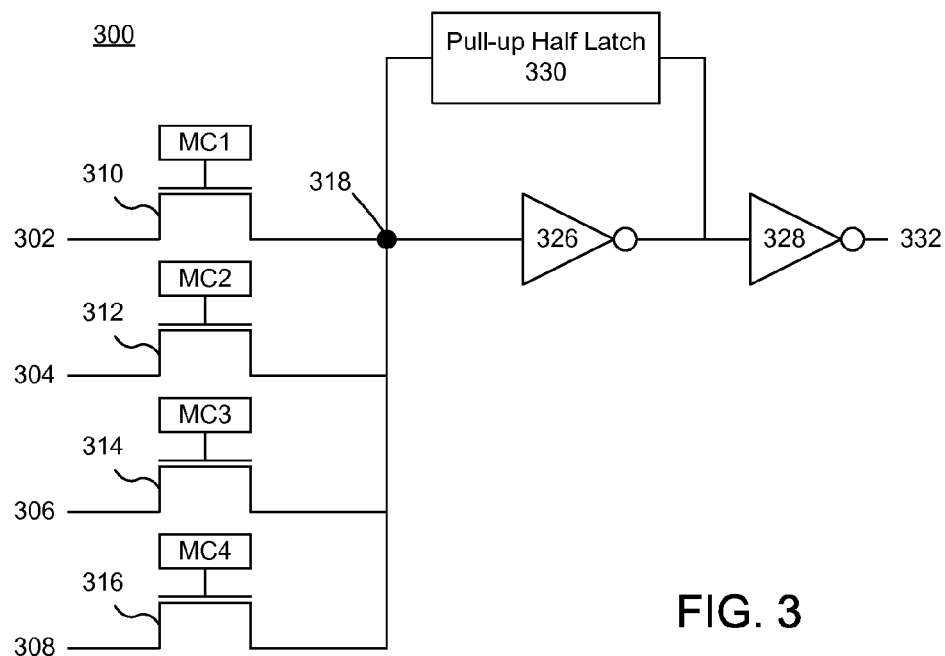
FIG. 3 is a block diagram illustrating an exemplary interconnect multiplexer.
FIG. 4 is a table illustrating behavior of the interconnect multiplexer of FIG. 3 responsive to an SEU.
FIG. 5 is another table illustrating additional behavior of the interconnect multiplexer of FIG. 3 responsive to an SEU.

FIG. 3 is a block diagram illustrating an exemplary interconnect multiplexer 300. Interconnect multiplexer 300 includes transistors 310, 312, 314, and 316. Each of transistors 310, 312, 314, and 316 has a gate coupled to a memory cell. The gate of transistor 310 is coupled to memory cell MC1. The gate of transistor 312 is coupled to memory cell MC2. The gate of transistor 314 is coupled to memory cell MC3. The gate of transistor 316 is coupled to memory cell MC4.

Input signals 302, 304, 306, and 308 are provided to respective transistors 310, 312, 314, and 316. The memory cell coupled to each transistor gate determines whether the transistor passes the signal input thereto on to node 318. For example, a value of one stored in memory cell MC1 turns transistor 310 on and allows signal 302 to pass through to node 318. A zero stored in memory cell MC1 turns off transistor 310 and does not allow signal 302 to pass through to node 318.

Node 318 is coupled to an output of a pull-up half latch 330 and an input to an inverter 326. The output of inverter 326 is coupled to an input to another inverter 328 and to an output of half latch 330. An output of inverter 328 generates output signal 332 of interconnect multiplexer 300.

The values programmed into MC1, MC2, MC3, and MC4 are from the configuration bitstream that is loaded into the IC including interconnect multiplexer 300. A review of the operation of interconnect multiplexer 300 reveals which of MC1, MC2, MC3, and MC4 are considered critical. Configuration bits for interconnect multiplexer 300 that are deemed critical are those configuration bits that, if flipped to an opposite value, e.g., from 0 to 1 or from 1 to 0, cause signal 332, as output from interconnect multiplexer 300, to change from 0 to 1 or from 1 to 0. As defined within this disclosure, a "critical interconnect multiplexer bit" is a configuration bit of an interconnect multiplexer that, if flipped, causes the output signal from the interconnect multiplexer to flip or change.

FIG. 4 is a table 400 illustrating behavior of interconnect multiplexer 300 of FIG. 3 responsive to an SEU. Table 400 illustrates different cases where interconnect multiplexer 300 is used within the circuit design. An interconnect multiplexer is used within a circuit design when at least one channel of the interconnect multiplexer is configured to pass a signal input thereto, e.g., is "on." Interconnect multiplexer 300 is configured to pass one of signals 302, 304, 306, or 308 at a time as part of the interconnect circuitry of the IC. For purposes of discussion, signal 302 is passed as memory cell MC1 stores a logic 1. Table 400 illustrates the behavior of interconnect multiplexer 300 when an SEU occurs in memory cell MC1, i.e., the memory cell controlling the "on" channel of interconnect multiplexer 300. Memory cells MC2, MC3, and MC4 are "do not cares" for purposes of the analysis of Table 400.

Case 1 illustrates behavior of interconnect multiplexer 300 when signal 302 is at a logic 1, memory cell MC1 stores a value of 1, and an SEU causes the value stored in memory cell MC1 to flip from a value of 1 to a value of 0. In normal operation without an SEU occurrence, node 318 is at a logic 1. When the SEU occurs thereby flipping the value stored in memory cell MC1 from 1 to 0, transistor 310 turns off. Despite transistor 310 turning off, node 318 remains at a logic 1 due to operation of pull-up half latch 330. As such, signal 332 remains at a logic 1. Memory cell MC1 is not critical in case 1.

Case 2 illustrates behavior of interconnect multiplexer 300 when signal 302 is at a logic 0, memory cell MC1 stores a value of 1, and an SEU causes the value stored in memory cell MC1 to flip from a value of 1 to a value of 0. In normal operation without an SEU occurrence, node 318 is at a logic 0. When the SEU occurs thereby flipping the value stored in memory cell MC1 from 1 to 0, transistor 310 turns off. Node 318 transitions from a logic 0 to a logic 1 due to operation of pull-up half latch 330. As such, signal 332 also transitions from a logic 0 to a logic 1. Memory cell MC1 is critical in case 2.

Table 400 illustrates that during normal operation with interconnect multiplexer 300 passing a signal, an SEU occurring on the memory cell controlling the signal being passed, i.e., the "on" channel, causes a change in the output of the circuit in 50% of the cases shown in Table 400.

FIG. 5 is a table 500 illustrating behavior of interconnect multiplexer 300 of FIG. 3 responsive to an SEU. Table 500 illustrates different cases where interconnect multiplexer 300 is on. For purposes of discussion, signal 302 is passed as memory cell MC1 stores a logic 1. Table 500 illustrates the behavior of interconnect multiplexer 300 when an SEU occurs in a memory cell of interconnect multiplexer 300 other than memory cell MC1, i.e., a memory cell controlling an off channel of interconnect multiplexer 300. For purposes of discussion, memory cell MC1 stores a value of 1 in each of cases 1-4 in Table 500. Accordingly, interconnect multiplexer 300 is used within the circuit design.

Case 1 illustrates behavior of interconnect multiplexer 300 when signal 302 is at a logic 1, signal 304 is at a logic 1, memory cell MC2 stores a value of 0, and an SEU causes the value stored in memory cell MC2 to flip from a value of 0 to a value of 1. In normal operation without an SEU occurrence, node 318 is at a logic 1. When the SEU occurs thereby flipping the value stored in memory cell MC2 from 0 to 1, transistor 312 turns on. Since node 318 is already at a logic 1 and transistor 312 is passing a logic 1, there is no change to the state of node 318 and no change to output signal 332, which is at a logic 1. Memory cell MC2 is not critical in case 1.

Case 2 illustrates behavior of interconnect multiplexer 300 when signal 302 is at a logic 0, signal 304 is at a logic 0, memory cell MC2 stores a value of 0, and an SEU causes the value stored in memory cell MC2 to flip from a value of 0 to a value of 1. In normal operation without an SEU occurrence, node 318 is at a logic 0. When the SEU occurs thereby flipping the value stored in memory cell MC2 from 0 to 1, transistor 312 turns on. Again, since node 318 is already at a logic 0 and transistor 312 passes a logic 0, there is no change to the state of node 318 and no change to output signal 332, which is at a logic 0. Memory cell MC2 is not critical in case 2.

Case 3 illustrates behavior of interconnect multiplexer 300 when signal 302 is at a logic 1, signal 304 is at a logic 0, memory cell MC2 stores a value of 0, and an SEU causes the value stored in memory cell MC2 to flip from a value of 0 to a value of 1. In normal operation without an SEU occurrence, node 318 is at a logic 1. When the SEU occurs thereby flipping the value stored in memory cell MC2 from 0 to 1, transistor 312 turns on. Transistor 312 turning on and passing a logic 0 does not change the state of node 318 as pull-up half latch 330 keeps the voltage steady at node 318 at a logic 1. Signal 332 also remains constant at a logic 1. Memory cell MC2 is not critical in case 3.

Case 4 illustrates behavior of interconnect multiplexer 300 when signal 302 is at a logic 0, signal 304 is at a logic 1, memory cell MC2 stores a value of 0, and an SEU causes the value stored in memory cell MC2 to flip from a value of 0 to a value of 1. In normal operation without an SEU occurrence, node 318 is at a logic 0. When the SEU occurs thereby flipping the value stored in memory cell MC2 from 0 to 1, transistor 312 turns on. Transistor 312 turning on and passing a logic 1, in conjunction with operation of pull-up half latch 330, causes node 318 to flip from a logic 0 to a logic 1. Accordingly, signal 332 flips from a logic 0 to a logic 1. Memory cell MC2 is critical in case 4.

Table 500 illustrates that during normal operation with interconnect multiplexer 300 passing a signal, an SEU on a memory cell of the interconnect multiplexer that does not control the "on" channel causes a change in the output of the circuit in 25% of the cases shown in Table 500.

Figure 6:
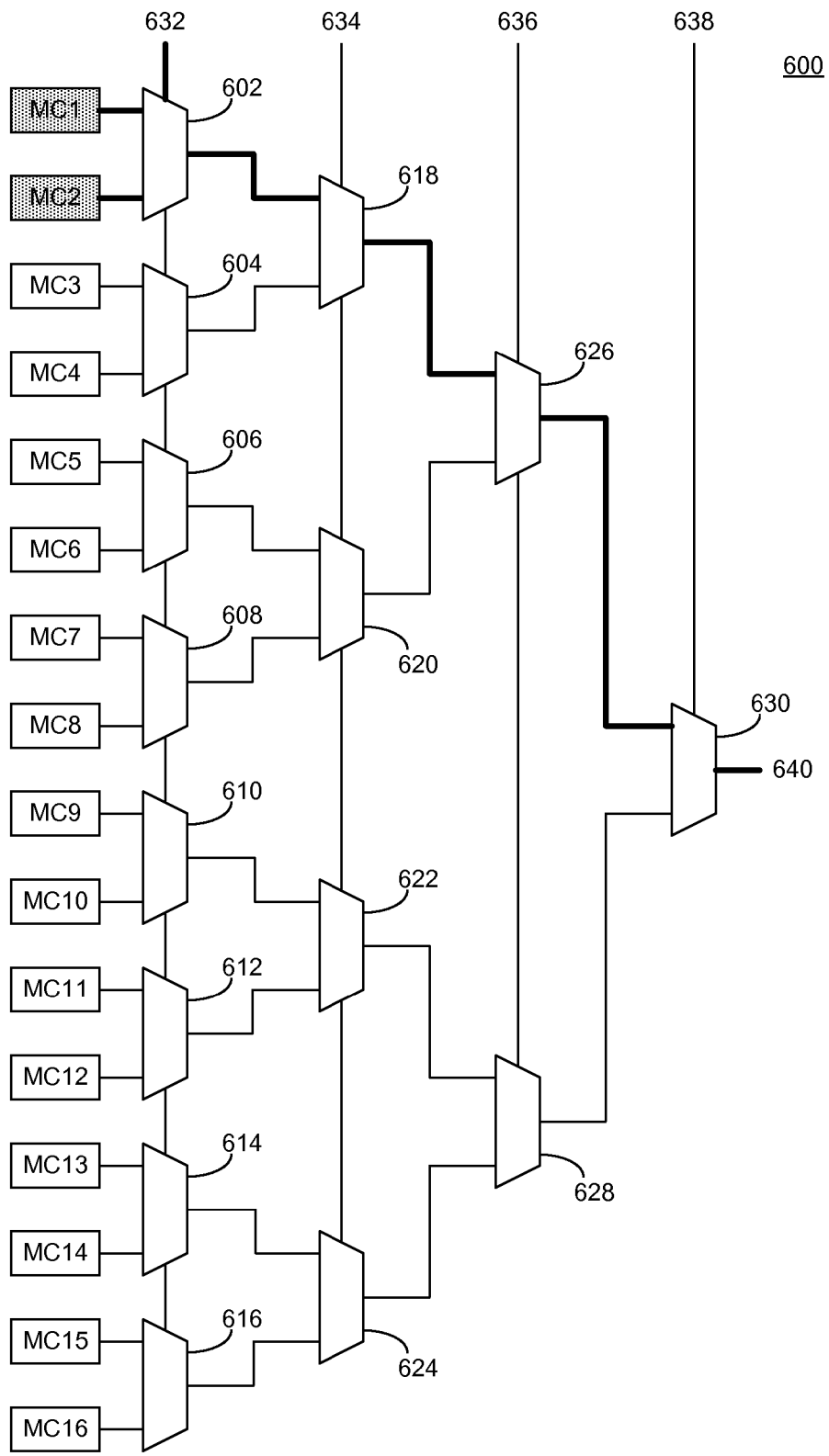
FIG. 6 is a block diagram illustrating an exemplary look-up table.

FIG. 6 is a block diagram illustrating an exemplary look-up table. As discussed, one or more look-up tables may be included in a CLB type of programmable circuit block depending upon the particular type of FPGA used as the target device. Look-up table 600 includes memory cells MC1 through MC16. Look-up table 600 further includes multiplexers 602 through 630, input signals 632, 634, 636, and 638, and generates output signal 640.

The values programmed into MC1 through MC16 are from the configuration bitstream that is loaded into the IC including look-up table 600. A review of the operation of look-up table 600 reveals which of the configuration bits loaded into MC1-MC16 are critical. Configuration bits for look-up table 600 that are deemed critical are those configuration bits that, if flipped to an opposite value, e.g., from 0 to 1 or from 1 to 0, cause signal 640, as output from look-up table 600, to change from 0 to 1 or from 1 to 0. As defined within this disclosure, a "critical look-up table bit" is a configuration bit of a look-up table that, if flipped, causes the output signal from the look-up table to flip or change.

In the case of a look-up table, whether a configuration bit is critical depends upon the number of inputs to the look-up table that are being used. A look-up table that is used by a circuit design will have at least one input being used. In the example of FIG. 6, input signal 632, which is bolded, is the only input to look-up table 600 that is used by the circuit design. The signal path within look-up table 600 that is active due to use of input signal 632 is also bolded. As shown, the only two memory cells influence the output of look-up table 600 when one input is used. The two memory cells are memory cells MC1 and MC2.

In general, the number of critical look-up table bits for a look-up table is calculated as $2^n$, where n is the number of inputs of the look-up table that are used in the circuit design. Thus, in the case where look-up table 600 uses one input, i.e., input 632, there are $2^1=2$ critical look-up table bits corresponding to memory cells MC1 and MC2. In the case where look-up table 600 uses two inputs, e.g., input signals 632 and 634, there are $2^2=4$ critical look-up table bits corresponding to memory cells MC1, MC2, MC3, and MC4. In the case where look-up table 600 uses three inputs, there are $2^3=8$ critical look-up table bits. In the case where look-up table 600 uses four inputs, there are $2^4$ critical look-up table bits. It should be appreciated that larger look-up table circuit structures will follow substantially the same plan where the more inputs used, the more critical look-up table bits there will be.

Figure 7:
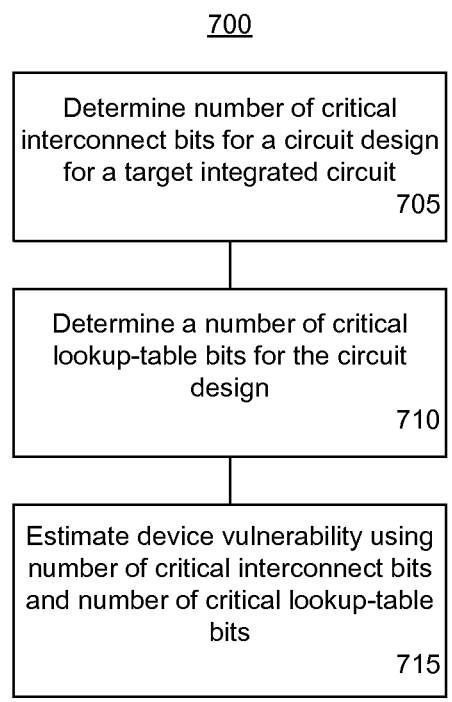
FIG. 7 is a flow chart illustrating a method of estimating a device vulnerability factor.

FIG. 7 is a flow chart illustrating a method 700 of estimating a DVF. As noted, the DVF is a circuit design-specific FIT rate for SEUs for a given IC. Method 700 may be performed by system 100 of FIG. 1 executing a suitable EDA application as described and operating on a circuit design that has been placed and routed.

Method 700 may begin in block 705 where the system determines the number of critical interconnect multiplexer bits for the circuit design. The circuit design is intended for a particular target integrated circuit. The target integrated circuit may be a programmable IC. For example, the programmable IC may be an FPGA.

In one aspect, the system determines the number of critical interconnect multiplexer bits in two parts. In a first part, the system calculates the number of critical interconnect multiplexer bits according to a number of interconnect multiplexers used in the circuit design and a probability of a value stored in a memory cell controlling an "on" channel of a used interconnect multiplexer flipping. The first part is determined according to the expression $P_u \times P_o$, where $P_u$ is the number of used interconnect multiplexers in the circuit design and $P_o$ is the probability of an SEU changing the output of a used interconnect multiplexer considering the "on" channel, e.g., the probability of an SEU occurring in the memory cell of the "on" channel of a used interconnect multiplexer and changing the output of the used interconnect multiplexer. Referring to FIGS. 3 and 4, with FIG. 4 illustrating the average case, the probability of an SEU changing the output of an interconnect multiplexer when considering the memory cell that controls the "on" channel is 50%. Thus, while the general case is defined by the expression $P_u \times P_o$, in the average case $P_o$ evaluates to ½, which means that the expression may be simplified to $P_u/2$ in the average case.

In the second part, the system calculates the number of critical interconnect multiplexer bits according to a number of interconnect multiplexers used in the circuit design and a probability of a value stored in a memory cell controlling an "off" channel of a used interconnect multiplexer flipping. The second part is determined according to the expression $P_u \times (A-1) \times P_z$, where A is a number of inputs of the used interconnect multiplexers and $P_z$ is the probability of an SEU occurring in an "off" channel of a used interconnect multiplexer that changes the output of the used interconnect multiplexer. In the example discussed with reference to FIG. 5, A=4. Referring to FIGS. 3 and 5, with FIG. 5 illustrating the average case, the probability of an SEU occurring in a memory cell controlling an "off" channel resulting in a change in the output of the interconnect multiplexer is 25%. Still, however, there are three unused channels in the multiplexer when one is turned on, thereby contributing to the term $(A-1) \times P_z$. Thus, while the general case is defined by the expression $P_u \times (A-1) \times P_z$, in the average case $P_z$ evaluates to ¼, which means that the expression may be simplified to $P_u \times (A-1)/4$ in the average case.

In one aspect, the number of critical interconnect multiplexer bits is the sum of the first part of the analysis and the second part of the analysis. Accordingly, the number of critical interconnect multiplexer bits may be determined using the expression $(P_u \times P_o) + [P_u \times (A-1) \times P_z]$, which may be simplified to $$\frac{P_u}{2} + P_u \times \frac{A-1}{4}$$

in the average case.

When calculating the number of critical interconnect multiplexer bits, the system may determine that the target IC utilizes more than one size of interconnect multiplexer. For example, the target IC may include a 4:1 interconnect multiplexer as previously described and a 6:1 interconnect multiplexer. In that case, the system performs a separate, or independent, two part analysis for each different size of interconnect multiplexer. The number of critical interconnect multiplexer bits for each size interconnect multiplexer is the sum of the two part analysis as described. The total number of critical interconnect multiplexer bits across both sizes of interconnect multiplexer is the sum of the two part analysis for 4:1 interconnect multiplexers and the two part analysis for the 6:1 interconnect multiplexers.

In block 710, the system determines a number of critical look-up table bits for the circuit design. In one aspect, the system calculates the number critical look-up table bits according to a number of look-up tables used in the circuit design and a number of inputs used for each used look-up table in the circuit design. In one example, the system determines the number of critical look-up table bits using the expression $\Sigma_1^i N_{ui} \times 2^i$, where $N_{ui}$ is a number of used look-up tables in the circuit design having i used inputs.

In block 715, the system estimates the DVF for the circuit design for the target IC using the number of critical interconnect multiplexer bits and the number of critical look-up table bits. In one aspect, the system estimates the DVF using the expression $$\frac{(P_u \times P_o) + [P_u \times (A-1)P_z] + \sum_1^i N_{ui} \times 2^i}{P \times A + N \times 2^j},$$

where $P_u$ is the number of used interconnect multiplexers in the circuit design, $P_o$ is the probability of an SEU occurring in a memory cell of an "on" channel of an interconnect multiplexer changing the output, A is a number of inputs of the used interconnect multiplexers, $P_z$ is the probability of an SEU occurring in a memory cell of an "off" channel of an interconnect multiplexer that changes the output, $N_{ui}$ is a number of used look-up tables in the circuit design having i used inputs, P is a total number of interconnect multiplexers in the target IC, N is a total number of look-up tables in the target IC, and j is a maximum number of inputs into a look-up table.

In illustration, consider the case in which $P_u$=4,000,000, $P_o$=½, A=4, $P_z$=¼, P=10,000,000, N=400,000, and j=6. Of the look-up tables in the target IC, the circuit design uses:

20,000 look-up tables with 1 used input, wherein $N_{u1} \times 2^1$=40,000;

20,000 look-up tables with 2 used inputs, wherein $N_{u2} \times 2^2$=80,000;

60,000 look-up tables with 3 used inputs, wherein $N_{u3} \times 2^3$=480,000;

60,000 look-up tables with 4 used inputs, wherein $N_{u4} \times 2^4$=960,000;

60,000 look-up tables with 5 used inputs, wherein $N_{u5} \times 2^5$=1,920,000; and 60,000 look-up tables with 6 used inputs, wherein $N_{u6} \times 2^6$=3,840,000.

With the above in mind, the summation term $\Sigma_1^i N_{ui} \times 2^i$ that determines the total number of look-up table critical bits evaluates to 7,320,000.

The estimated DVF is calculated using the expression $$\frac{(P_u \times P_o) + [P_u \times (A-1)P_z] + \sum_1^i N_{ui} \times 2^i}{P \times A + N \times 2^j},$$

as follows:

$$= \frac{4,000,000 \times \frac{1}{2} + 4,000,000 \times (4-1)1/4 + 7,320,000}{10,000,000 \times 4 + 400,000 \times 64}$$

$$= \frac{2,000,000 + 3,000,000 + 7,320,000}{40,000,000 + 400,000 \times 64}$$

$$= \frac{12,320,000}{65,600,000}$$

$$= .1878$$

Thus, the estimated DVF is 0.1878, which may be expressed as a percentage as 18.78%.

The estimated DVF may be stored for subsequent use. In one aspect, the estimated DVF for a circuit design may be stored within the memory elements, e.g., local memory and/or a bulk storage device, of a data processing system such as system 100 of FIG. 1. The DVF may be stored in the memory elements in association with the circuit design. As an example, the estimated DVF may be stored in association with the circuit design within a library of circuit designs, circuit blocks, or the like maintained within bulk storage device 125. Such a library may also be stored in a network attached data storage device or other persistent data storage device accessible to system 100.

In another aspect, the estimated DVF may be stored as part of the circuit design. For example, having determined the estimated DVF for circuit design 155, system 100 may include the estimated DVF within circuit design 155 itself.

In that case, system 100 may read, or extract, the DVF directly from the circuit design.

The DVF may be used by system 100 to sort and/or distinguish among a plurality of circuit designs each associated with or including an estimated DVF. For example, system 100 may search for a circuit design from among a plurality circuit designs in the library having a lowest estimated DVF or an estimated DVF meeting user specified requirements. In one aspect, the circuit designs may be similar in terms of functionality. In another aspect, the circuit designs may be functionally equivalent, but have different estimated DVFs.

In still another example, the estimated DVF may be stored within an IC in which the circuit design is implemented. For example, an estimated DVF may be specified within a configuration bitstream implementation of a circuit design. Responsive to loading the configuration bitstream into an IC, e.g., an IC having an architecture as described with reference to FIG. 2 or other programmable IC, the estimated DVF may be stored within a register, registers, or other memory of the IC. Referring to FIG. 2, for example, the estimated DVF may be stored within a register, a BRAM, or the like. As such, the estimated DVF may be read back from the IC at a later time, e.g., when operating in the field and access to the original circuit design and/or circuit design documentation may not be available.

In accordance with the inventive arrangements disclosed herein, a circuit design for a target IC is evaluated to determine critical configuration bits of the circuit design. In one aspect, the particular configuration bits determined to be critical may be for selected types of programmable circuit blocks such as interconnect multiplexers and look-up tables. Of the configuration bits for such elements used in the circuit design, the system may determine which are critical. The system estimates a DVF, which is specific to the circuit design and the target IC, using the number of critical interconnect multiplexer bits and the number of critical look-up table bits.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined within this disclosure, the terms "a" and "an" mean one or more than one. The term "plurality," as defined herein, means two or more than two. The term "another," as defined herein, means at least a second or more. The term "coupled," as defined herein, means connected, whether directly without any intervening elements or indirectly with one or more intervening elements, unless otherwise indicated. Two elements may also be coupled mechanically, electrically, or communicatively linked through a communication channel, pathway, network, or system.

As defined herein, the term "automatically" means without user intervention. As defined herein, the term "user" means a human being. The term "and/or" as defined herein means any and all possible combinations of one or more of the associated listed items. The terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. Although the terms "first," "second," etc. may be used herein to describe various elements, these elements should not be limited by these terms, as these terms are only used to distinguish one element from another unless the context indicates otherwise.

As defined herein, the term "if" means "when," "upon," "in response to determining," "in response to detecting," "responsive to determining," or "responsive to detecting," depending on the context. Similarly, the phrase "if it is determined" or the phrase "if [a stated condition or event] is detected," as defined herein, means "upon determining," "in response to determining," "responsive to determining," "upon detecting [the stated condition or event]," "in response to detecting [the stated condition or event]," or "responsive to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like may represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure may be realized in hardware or a combination of hardware and software. One or more aspects may be realized in a centralized fashion in one system or in a distributed fashion where different elements are spread across several interconnected systems. Any kind of data processing system or other apparatus adapted for carrying out at least a portion of the methods described herein is suited.

One or more aspects further may be embedded in a computer program product, which includes all the features enabling the implementation of the methods described herein. The computer program product includes a computer-readable data storage medium. As defined herein, the phrase "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of a computer-readable storage medium may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in subsequent or other blocks that do not immediately follow.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code may include, but is not limited to, a subroutine, a function, a procedure, an object method, an object implementation, an executable application, an applet, a servlet, source code, object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

In one aspect, a method includes determining, using a processor, a number of critical interconnect multiplexer bits for a circuit design for a target IC, determining a number of critical look-up table bits for the circuit design, and estimating, using the processor, a device vulnerability factor for the circuit design for the target IC using the number of critical interconnect multiplexer bits and the number of critical look-up table bits.

Determining a number of critical interconnect multiplexer bits may include calculating the number of critical interconnect multiplexer bits according to a number of interconnect multiplexers used in the circuit design and a probability of a value stored in a memory cell controlling an on channel of a used interconnect multiplexer flipping.

For example, the number of critical interconnect multiplexer bits may depend upon the expression $P_u \times P_o$, where $P_u$ is a number of used interconnect multiplexers in the circuit design and $P_o$ is a probability of a single event upset occurring in a memory cell of an on channel of a used interconnect multiplexer changing an output of the used interconnect multiplexer.

Determining a number of critical interconnect multiplexer bits may also include calculating the number of critical interconnect multiplexer bits according to a number of interconnect multiplexers used in the circuit design and a probability of a value stored in a memory cell controlling an off channel of a used interconnect multiplexer flipping.

For example, the number of critical interconnect multiplexer bits may depend upon the expression $P_u \times (A-1) \times P_z$, where $P_u$ is a number of used interconnect multiplexers in the circuit design, A is a number of inputs of the used interconnect multiplexers, and $P_z$ is a probability of a single event upset occurring in a memory cell of an off channel of a used interconnect multiplexer changing an output of the used interconnect multiplexer.

Determining a number of critical look-up table bits may include calculating a number critical look-up table bits according to a number of look-up tables used and a number of inputs used for each used look-up table.

For example, the number of critical look-up table bits may be depend upon the expression $\Sigma_1^i N_{ui} \times 2^i$, where $N_{ui}$ is a number of used look-up tables in the circuit design having i used inputs.

The device vulnerability factor may be calculated according to $$\frac{(P_u \times P_o) + [P_u \times (A-1) P_z] + \sum_1^i N_{ui} \times 2^i}{P \times A + N \times 2^j},$$

where $P_u$ is the number of used interconnect multiplexers in the circuit design, $P_o$ is a probability of a single event upset occurring in a memory cell of an on channel of a used interconnect multiplexer changing an output of the used interconnect multiplexer, A is a number of inputs of the used interconnect multiplexers, $P_z$ is a probability of a single event upset occurring in a memory cell of an off channel of a used interconnect multiplexer changing an output of the used interconnect multiplexer, $N_{ui}$ is a number of used look-up tables in the circuit design having i used inputs, P is a total number of interconnect multiplexers in the integrated circuit, N is a total number of look-up tables in the integrated circuit, and j is a maximum number of inputs into a look-up table.

A system includes a processor programmed to initiate executable operations. The executable operations include determining a number of critical interconnect multiplexer bits for a circuit design for a target IC, determining a number of critical look-up table bits for the circuit design, and estimating a device vulnerability factor for the circuit design for the target IC using the number of critical interconnect multiplexer bits and the number of critical look-up table bits.

Determining a number of critical interconnect multiplexer bits may include calculating the number of critical interconnect multiplexer bits according to a number of interconnect multiplexers used in the circuit design and a probability of a value stored in a memory cell controlling an on channel of a used interconnect multiplexer flipping.

For example, the number of critical interconnect multiplexer bits may depend upon the expression $P_u \times P_o$, where $P_u$ is a number of used interconnect multiplexers in the circuit design and $P_o$ is a probability of a single event upset occurring in a memory cell of an on channel of a used interconnect multiplexer changing an output of the used interconnect multiplexer.

Determining a number of critical interconnect multiplexer bits may include calculating the number of critical interconnect multiplexer bits according to a number of interconnect multiplexers used in the circuit design and a probability of a value stored in a memory cell controlling an off channel of a used interconnect multiplexer flipping.

For example, the number of critical interconnect multiplexer bits may depend upon the expression $P_u \times (A-1) \times P_z$, where $P_u$ is a number of used interconnect multiplexers in the circuit design, A is a number of inputs of the used interconnect multiplexers, and $P_z$ is a probability of a single event upset occurring in a memory cell of an off channel of a used interconnect multiplexer changing an output of the used interconnect multiplexer.

Determining a number of critical look-up table bits may include calculating a number critical look-up table bits according to a number of look-up tables used and a number of inputs used for each used look-up table.

For example, the number of critical look-up table bits may depend upon the expression $\Sigma_1^i N_{ui} \times 2^i$, where $N_{ui}$ is a number of used look-up tables in the circuit design having i used inputs.

The device vulnerability factor may be calculated according to $$\frac{(P_u \times P_o) + [P_u \times (A-1) P_z] + \sum_1^i N_{ui} \times 2^i}{P \times A + N \times 2^j},$$

where $P_u$ is the number of used interconnect multiplexers in the circuit design, $P_o$ is a probability of a single event upset occurring in a memory cell of an on channel of a used interconnect multiplexer changing an output of the used interconnect multiplexer, A is a number of inputs of the used interconnect multiplexers, $P_z$ is a probability of a single event upset occurring in a memory cell of an off channel of a used interconnect multiplexer changing an output of the used interconnect multiplexer, $N_{ui}$ is a number of used look-up tables in the circuit design having i used inputs, P is a total number of interconnect multiplexers in the integrated circuit, N is a total number of look-up tables in the integrated circuit, and j is a maximum number of inputs into a look-up table.

A non-transitory computer-readable storage medium has instructions stored thereon which, when executed by a processor, perform a method. The method includes determining, using the processor, a number of critical interconnect multiplexer bits for a circuit design for a target IC, determining a number of critical look-up table bits for the circuit design, and estimating, using the processor, a device vulnerability factor for the circuit design for the target integrated circuit using the number of critical interconnect multiplexer bits and the number of critical look-up table bits.

Determining a number of critical interconnect multiplexer bits may include calculating the number of critical interconnect multiplexer bits according to a number of interconnect multiplexers used in the circuit design and a probability of a value stored in a memory cell controlling an on channel of a used interconnect multiplexer flipping.

Determining a number of critical interconnect multiplexer bits may include calculating the number of critical interconnect multiplexer bits according to a number of interconnect multiplexers used in the circuit design and a probability of a value stored in a memory cell controlling an off channel of a used interconnect multiplexer flipping.

Determining a number of critical look-up table bits may include calculating a number critical look-up table bits according to a number of look-up tables used and a number of inputs used for each used look-up table.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
   determining, using a processor, a number of critical interconnect multiplexer bits for a circuit design for a target integrated circuit;
   determining a number of critical look-up table bits for the circuit design by calculating a number of look-up tables of the target integrated circuit used by the circuit design and a number of inputs used for each look-up table of the target integrated circuit used by the circuit design;
   estimating, using the processor, a device vulnerability factor for the circuit design for the target integrated circuit using the number of critical interconnect multiplexer bits and the number of critical look-up table bits;
   wherein the device vulnerability factor indicates a failures in time for single event upsets in the target integrated circuit implementing the circuit design and the target integrated circuit is a programmable integrated circuit; and
   storing the estimated device vulnerability factor.

2. The method of claim 1, wherein determining the number of critical interconnect multiplexer bits comprises:
   calculating the number of critical interconnect multiplexer bits according to a number of interconnect multiplexers used in the circuit design and a probability of a value stored in a memory cell controlling an on channel of a used interconnect multiplexer flipping.

3. The method of claim 1, wherein:
   the number of critical interconnect multiplexer bits depends upon an expression $P_u \times P_o$, where:
   $P_u$ is a number of used interconnect multiplexers in the circuit design; and
   $P_o$ is a probability of a single event upset occurring in a memory cell of an on channel of a used interconnect multiplexer changing an output of the used interconnect multiplexer.

4. The method of claim 1, wherein determining the number of critical interconnect multiplexer bits comprises:
   calculating the number of critical interconnect multiplexer bits according to a number of interconnect multiplexers used in the circuit design and a probability of a value stored in a memory cell controlling an off channel of a used interconnect multiplexer flipping.

5. The method of claim 1, wherein:
   the number of critical interconnect multiplexer bits depends upon an expression $P_u \times (A-1) \times P_z$, where:
   $P_u$ is a number of used interconnect multiplexers in the circuit design;
   A is a number of inputs of the used interconnect multiplexers; and
   $P_z$ is a probability of a single event upset occurring in a memory cell of an off channel of a used interconnect multiplexer changing an output of the used interconnect multiplexer.

6. The method of claim 1, wherein:
   the number of critical look-up table bits depends upon an expression $\Sigma_1^i N_{ui} \times 2^i$, where:
   $N_{ui}$ is a number of used look-up tables in the circuit design having i used inputs.

7. The method of claim 1, wherein:
   the device vulnerability factor is calculated according to $$\frac{(P_u \times P_o) + [P_u \times (A-1)P_z] + \sum_1^i N_{ui} \times 2^i}{P \times A + N \times 2^j},$$

where:
   $P_u$ is the number of used interconnect multiplexers in the circuit design;
   $P_o$ is a probability of a single event upset occurring in a memory cell of an on channel of a used interconnect multiplexer changing an output of the used interconnect multiplexer;
   A is a number of inputs of the used interconnect multiplexers;
   $P_z$ is a probability of a single event upset occurring in a memory cell of an off channel of a used interconnect multiplexer changing an output of the used interconnect multiplexer;
   $N_{ui}$ is a number of used look-up tables in the circuit design having i used inputs;
   P is a total number of interconnect multiplexers in the integrated circuit;
   N is a total number of look-up tables in the integrated circuit; and
   j is a maximum number of inputs into a look-up table.

8. A system, comprising:
   a processor programmed to initiate executable operations comprising:
   determining a number of critical interconnect multiplexer bits for a circuit design for a target integrated circuit;
   determining a number of critical look-up table bits for the circuit design by calculating a number of look-up tables of the target integrated circuit used by the circuit design and a number of inputs used for each look-up table of the target integrated circuit used by the circuit design;
   estimating a device vulnerability factor for the circuit design for the target integrated circuit using the number of critical interconnect multiplexer bits and the number of critical look-up table bits;
   wherein the device vulnerability factor indicates a failures in time for single event upsets in the target integrated circuit implementing the circuit design and the target integrated circuit is a programmable integrated circuit; and
   storing the estimated device vulnerability factor.

9. The system of claim 8, wherein determining the number of critical interconnect multiplexer bits comprises:
   calculating the number of critical interconnect multiplexer bits according to a number of interconnect multiplexers used in the circuit design and a probability of a value stored in a memory cell controlling an on channel of a used interconnect multiplexer flipping.

10. The system of claim 8, wherein:
    the number of critical interconnect multiplexer bits depends upon an expression $P_u \times P_o$, where:
    $P_u$ is a number of used interconnect multiplexers in the circuit design; and
    $P_o$ is a probability of a single event upset occurring in a memory cell of an on channel of a used interconnect multiplexer changing an output of the used interconnect multiplexer.

11. The system of claim 8, wherein determining the number of critical interconnect multiplexer bits comprises:
calculating the number of critical interconnect multiplexer bits according to a number of interconnect multiplexers used in the circuit design and a probability of a value stored in a memory cell controlling an off channel of a used interconnect multiplexer flipping.

12. The system of claim 8, wherein:
the number of critical interconnect multiplexer bits depends upon an expression $P_u \times (A-1) \times P_z$, where:
$P_u$ is a number of used interconnect multiplexers in the circuit design;
A is a number of inputs of the used interconnect multiplexers; and
$P_z$ is a probability of a single event upset occurring in a memory cell of an off channel of a used interconnect multiplexer changing an output of the used interconnect multiplexer.

13. The system of claim 8, wherein:
the number of critical look-up table bits depends upon an expression $\Sigma_1^i N_{ui} \times 2^i$, where:
$N_{ui}$ is a number of used look-up tables in the circuit design having i used inputs.

14. The system of claim 8, wherein:
the device vulnerability factor is calculated according to $$\frac{(P_u \times P_o) + [P_u \times (A-1)P_z] + \sum_1^i N_{ui} \times 2^i}{P \times A + N \times 2^j},$$

where:
$P_u$ is the number of used interconnect multiplexers in the circuit design;
$P_o$ is a probability of a single event upset occurring in a memory cell of an on channel of a used interconnect multiplexer changing an output of the used interconnect multiplexer;
A is a number of inputs of the used interconnect multiplexers;
$P_z$ is a probability of a single event upset occurring in a memory cell of an off channel of a used interconnect multiplexer changing an output of the used interconnect multiplexer;
$N_{ui}$ is a number of used look-up tables in the circuit design having i used inputs;
P is a total number of interconnect multiplexers in the integrated circuit;
N is a total number of look-up tables in the integrated circuit; and
j is a maximum number of inputs into a look-up table.

15. A non-transitory computer-readable storage medium having instructions stored thereon which, when executed by a processor, perform a method comprising:
determining, using the processor, a number of critical interconnect multiplexer bits for a circuit design for a target integrated circuit;
determining a number of critical look-up table bits for the circuit design by calculating a number of look-up tables of the target integrated circuit used by the circuit design and a number of inputs used for each look-up table of the target integrated circuit used by the circuit design;
estimating, using the processor, a device vulnerability factor for the circuit design for the target integrated circuit using the number of critical interconnect multiplexer bits and the number of critical look-up table bits;
wherein the device vulnerability factor indicates a failures in time for single event upsets in the target integrated circuit implementing the circuit design and the target integrated circuit is a programmable integrated circuit; and
storing the estimated device vulnerability factor.

16. The non-transitory computer-readable storage medium of claim 15, wherein determining the number of critical interconnect multiplexer bits comprises:
calculating the number of critical interconnect multiplexer bits according to a number of interconnect multiplexers used in the circuit design and a probability of a value stored in a memory cell controlling an on channel of a used interconnect multiplexer flipping.

17. The non-transitory computer-readable storage medium of claim 15, wherein determining the number of critical interconnect multiplexer bits comprises:
calculating the number of critical interconnect multiplexer bits according to a number of interconnect multiplexers used in the circuit design and a probability of a value stored in a memory cell controlling an off channel of a used interconnect multiplexer flipping.

18. The non-transitory computer-readable storage medium of claim 15, wherein determining the number of critical look-up table bits comprises:
calculating a number critical look-up table bits according to a number of look-up tables used and a number of inputs used for each used look-up table.

* * * * *